US012770574B2

(12) United States Patent
Park et al.

(10) Patent No.: US 12,770,574 B2
(45) Date of Patent: *Oct. 20, 2026

(54) GATE DRIVER, DISPLAY DEVICE INCLUDING THE GATE DRIVER, AND ELECTRONIC APPARATUS INCLUDING THE DISPLAY DEVICE

(71) Applicant: Samsung Display Co., Ltd., Yongin-Si (KR)

(72) Inventors: Junhyun Park, Yongin-si (KR); Youngwan Seo, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/084,764

(22) Filed: Mar. 20, 2025

(65) Prior Publication Data

US 2025/0378790 A1 Dec. 11, 2025

(30) Foreign Application Priority Data

Jun. 5, 2024 (KR) ........................ 10-2024-0073418

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0852* (2013.01); *G09G 2300/0861* (2013.01)

(58) Field of Classification Search
CPC .. G09G 3/3233; G09G 3/3266; G09G 3/3677; G09G 2300/0819; G09G 2300/0852; G09G 2300/0861
See application file for complete search history.

(56) References Cited

U.S. PATENT DOCUMENTS 11,276,711 B2 3/2022 Inoue et al.
11,551,604 B2 * 1/2023 Kim ..................... G09G 3/3677
12,475,856 B2 11/2025 Cha et al.
(Continued)

FOREIGN PATENT DOCUMENTS

KR 10-2471098 B1 11/2022

*Primary Examiner* — Ryan A Lubit
(74) *Attorney, Agent, or Firm* — Innovation Counsel LLP

(57) ABSTRACT

In a gate driver that has first to $n^{th}$ stages including a $k^{th}$ stage, wherein k is a number between 1 and n, the $k^{th}$ stage includes a first transistor which transmits an input signal to a first control node, a fifth transistor including a gate connected to an inverting control node, a first terminal which receives a high gate voltage, and a second terminal connected to an output node, a sixth transistor including a gate connected to a second control node, a first terminal which receives a first low gate voltage or a clock signal, and a second terminal connected to the output node, and a fourth transistor connected between the first control node and the second control node, the fourth transistor including a gate which receives the first low gate voltage or a low gate voltage and a back gate which receives an input voltage.

12 Claims, 12 Drawing Sheets

(56) References Cited

U.S. PATENT DOCUMENTS

| | | | | |
|---|---|---|---|---|
| 2018/0040274 | A1 | 2/2018 | Kurokawa | |
| 2020/0133327 | A1* | 4/2020 | Lee | G06F 1/08 |
| 2022/0103170 | A1* | 3/2022 | Liberti | H03K 17/567 |
| 2022/0383821 | A1* | 12/2022 | No | G09G 3/3266 |
| 2023/0009494 | A1* | 1/2023 | Noh | G09G 3/3266 |
| 2023/0075599 | A1* | 3/2023 | Kim | H10K 59/126 |
| 2025/0124857 | A1* | 4/2025 | Zhang | G09G 3/32 |

* cited by examiner

GATE DRIVER, DISPLAY DEVICE INCLUDING THE GATE DRIVER, AND ELECTRONIC APPARATUS INCLUDING THE DISPLAY DEVICE

CROSS-REFERENCE TO RELATED APPLICATION(S)

This application claims priority, under 35 USC § 119, to Korean Patent Application No. 10-2024-0073418 filed on Jun. 5, 2024 in the Korean Intellectual Property Office (KIPO), the entire disclosure of which is incorporated by reference herein.

BACKGROUND

1. Field

Embodiments relate to a display device. More particularly, embodiments relate to a gate driver with improved reliability, a display device including the gate driver, and an electronic apparatus including the display device.

2. Description of the Related Art

A display device may include a display panel and a gate driver. The display panel may include pixels, and the gate driver may include stages that provide gate signals to the pixels.

Each of the stages may include a plurality of transistors and a plurality of capacitors. In order to protect a transistor included in the stage, the stage may include at least one always-on transistor (AOT). A turn-on voltage which is a constant voltage may be applied to a gate of the always-on transistor, and thus, the always-on transistor may be continuously maintained in a turned-on state.

SUMMARY

Embodiments provide a gate driver with improved reliability.

Embodiments provide a display device including a gate driver with improved reliability and an electronic apparatus including the display device.

In a gate driver including first to $n^{th}$ stages, where n is a natural number greater than 1, according to embodiments, a $k^{th}$ stage of the first to $n^{th}$ stages, where k is a natural number greater than 1 and less than n, includes a first transistor which transmits an input signal to a first control node, a fifth transistor including a gate connected to an inverting control node, a first terminal which receives a high gate voltage, and a second terminal connected to an output node which outputs a gate signal, a sixth transistor including a gate connected to a second control node, a first terminal which receives a first low gate voltage or a clock signal, and a second terminal connected to the output node, and a fourth transistor connected between the first control node and the second control node, the fourth transistor including a gate which receives the first low gate voltage or a low gate voltage higher or lower than the first low gate voltage and a back gate which receives an input voltage that is a variable voltage.

In an embodiment, the input voltage may be a voltage of the inverting control node of a $k-1^{th}$ stage, the $k^{th}$ stage, or a $k+1^{th}$ stage.

In an embodiment, the $k^{th}$ stage may further include a second transistor including a gate connected to the second control node, a first terminal which receives the first low gate voltage, and a second terminal connected to the inverting control node, a third transistor including a gate connected to the first control node, a first terminal which receives the high gate voltage, and a second terminal connected to the inverting control node, a first capacitor including a first terminal connected to the second control node and a second terminal connected to the output node, and a second capacitor including a first terminal which receives the high gate voltage and a second terminal connected to the inverting control node.

In an embodiment, the $k^{th}$ stage may further include a second transistor including a gate connected to the first control node, a first terminal which receives the first low gate voltage, and a second terminal connected to the inverting control node, a third transistor including a gate connected to the first control node, a first terminal which receives the high gate voltage, and a second terminal connected to the inverting control node, a seventh transistor including a gate connected to the inverting control node, a first terminal which receives the first low gate voltage, and a second terminal connected to the output node, an eighth transistor including a gate which receives an inverting clock signal, a first terminal which receives the input signal, and a second terminal connected to the first control node, a tenth transistor including a gate connected to the inverting control node, a first terminal which receives the high gate voltage, and a second terminal connected to a carry output node which outputs a carry signal, an eleventh transistor including a gate connected to the inverting control node, a first terminal which receives the first low gate voltage, and a second terminal connected to the carry output node, a first capacitor including a first terminal connected to the second control node and a second terminal connected to the carry output node, and a second capacitor including a first terminal which receives the high gate voltage and a second terminal connected to the first control node.

In an embodiment, the $k^{th}$ stage may further include a ninth transistor including a gate which receives a reset signal, a first terminal which receives the high gate voltage, and a second terminal connected to the first control node.

In an embodiment, the fourth transistor may be a P-type transistor.

In an embodiment, a threshold voltage of the fourth transistor may be negatively shifted in a hold period in which the gate signal has the first low gate voltage.

In an embodiment, the threshold voltage of the fourth transistor may be positively shifted in an output period in which the gate signal has the high gate voltage.

In a gate driver including a plurality of stages according to embodiments, each of the plurality of stages may include a first transistor which transmits an input signal to a first control node, a fifth transistor including a gate connected to an inverting control node, a first terminal which receives a high gate voltage, and a second terminal connected to an output node which outputs a gate signal, a sixth transistor including a gate connected to a second control node, a first terminal which receives a first low gate voltage or a clock signal, and a second terminal connected to the output node, and a fourth transistor connected between the first control node and the second control node, the fourth transistor including a gate which receives the first low gate voltage or a low gate voltage higher or lower than the first low gate voltage and a back gate which receives an input voltage that is a constant voltage.

In an embodiment, the input voltage may be the high gate voltage or a voltage higher or lower than the high gate voltage.

In an embodiment, each of the plurality of stages may further include a second transistor including a gate connected to the second control node, a first terminal which receives the first low gate voltage, and a second terminal connected to the inverting control node, a third transistor including a gate connected to the first control node, a first terminal which receives the high gate voltage, and a second terminal connected to the inverting control node, a first capacitor including a first terminal connected to the second control node and a second terminal connected to the output node, and a second capacitor including a first terminal which receives the high gate voltage and a second terminal connected to the inverting control node.

In an embodiment, each of the plurality of stages may further include a second transistor including a gate connected to the first control node, a first terminal which receives the first low gate voltage, and a second terminal connected to the inverting control node, a third transistor including a gate connected to the first control node, a first terminal which receives the high gate voltage, and a second terminal connected to the inverting control node, a seventh transistor including a gate connected to the inverting control node, a first terminal which receives the first low gate voltage, and a second terminal connected to the output node, an eighth transistor including a gate which receives an inverting clock signal, a first terminal which receives the input signal, and a second terminal connected to the first control node, a tenth transistor including a gate connected to the inverting control node, a first terminal which receives the high gate voltage, and a second terminal connected to a carry output node which outputs a carry signal, an eleventh transistor including a gate connected to the inverting control node, a first terminal which receives the first low gate voltage, and a second terminal connected to the carry output node, a first capacitor including a first terminal connected to the second control node and a second terminal connected to the carry output node, and a second capacitor including a first terminal which receives the high gate voltage and a second terminal connected to the first control node.

In an embodiment, each of the plurality of stages may further include a ninth transistor including a gate which receives a reset signal, a first terminal which receives the high gate voltage, and a second terminal connected to the first control node.

In an embodiment, the fourth transistor may be a P-type transistor.

In an embodiment, a threshold voltage of the fourth transistor may be negatively shifted in a hold period in which the gate signal has the first low gate voltage.

In an embodiment, the threshold voltage of the fourth transistor may not be shifted in an output period in which the gate signal has the high gate voltage.

A display device according to embodiments may include a display panel including pixels, a data driver which provides data signals to the pixels, and a gate driver including first to $n^{th}$ stages which provide first to $n^{th}$ gate signals to the pixels, where n is a natural number greater than 1. A $k^{th}$ stage of the first to $n^{th}$ stages, where k is a natural number greater than 1 and less than n, may include a first transistor which transmits an input signal to a first control node, a fifth transistor including a gate connected to an inverting control node, a first terminal which receives a high gate voltage, and a second terminal connected to an output node which outputs a $k^{th}$ gate signal of the first to $n^{th}$ gate signals, a sixth transistor including a gate connected to a second control node, a first terminal which receives a first low gate voltage or a clock signal, and a second terminal connected to the output node, and a fourth transistor connected between the first control node and the second control node, the fourth transistor including a gate which receives the first low gate voltage or a low gate voltage higher or lower than the first low gate voltage and a back gate which receives an input voltage.

In an embodiment, each of the pixels may include a driving transistor including a gate connected to a first node, a first terminal connected to a second node, a second terminal connected to a third node, a writing transistor including a gate which receives a writing gate signal, a first terminal which receives one of the data signals, and a second terminal connected to the second node, a compensation transistor including a gate which receives a compensation gate signal, a first terminal connected to the third node, and a second terminal connected to the first node, an initialization transistor including a gate which receives an initialization gate signal, a first terminal which receives a first initialization voltage, and a second terminal connected to the first node, a first emission transistor including a gate which receives an emission signal, a first terminal which receives a first power voltage, and a second terminal connected to the second node, a second emission transistor including a gate which receives the emission signal, a first terminal connected to the third node, and a second terminal connected to a fourth node, a bypass transistor including a gate which receives a bypass gate signal, a first terminal which receives a second initialization voltage, and a second terminal connected to the fourth node, a bias transistor including a gate which receives the bypass gate signal, a first terminal which receives a bias voltage, and a second terminal connected to the second node, a storage capacitor including a first terminal which receives the first power voltage and a second terminal connected to the first node, and a light-emitting element including a first terminal connected to the fourth node and a second terminal which receives a second power voltage.

In an embodiment, the $k^{th}$ gate signal may be one of the compensation gate signal, the initialization gate signal, the emission signal, and the bypass gate signal.

In an embodiment, the fourth transistor may be a P-type transistor.

In an electronic apparatus including a display device which displays an image and a processor which controls the display device according to embodiments, the display device may include a display panel including pixels, a data driver which provides data signals to the pixels, and a gate driver including first to $n^{th}$ stages which provide first to $n^{th}$ gate signals to the pixels, where n is a natural number greater than 1. A $k^{th}$ stage of the first to $n^{th}$ stages, where k is a natural number greater than 1 and less than n, may include a first transistor which transmits an input signal to a first control node, a fifth transistor including a gate connected to an inverting control node, a first terminal which receives a high gate voltage, and a second terminal connected to an output node which outputs a $k^{th}$ gate signal of the first to $n^{th}$ gate signals, a sixth transistor including a gate connected to a second control node, a first terminal which receives a first low gate voltage or a clock signal, and a second terminal connected to the output node, and a fourth transistor connected between the first control node and the second control node, the fourth transistor including a gate which receives the first low gate voltage or a low gate voltage higher or lower than the first low gate voltage and a back gate which receives an input voltage.

In the gate driver, the display device, and the electronic apparatus according to the embodiments, the threshold voltage of the fourth transistor which is an always-on transistor (AOT) may be negatively shifted in a hold period in which the gate signal has the low gate voltage, and thus, leakage current of the fourth transistor may be reduced. Further, the threshold voltage of the fourth transistor may not be shifted or may be positively shifted in the output period in which the gate signal has the high gate voltage, and thus, the sixth transistor which is a buffer transistor may be quickly turned-on or turned-off. Accordingly, reliability of the gate driver may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
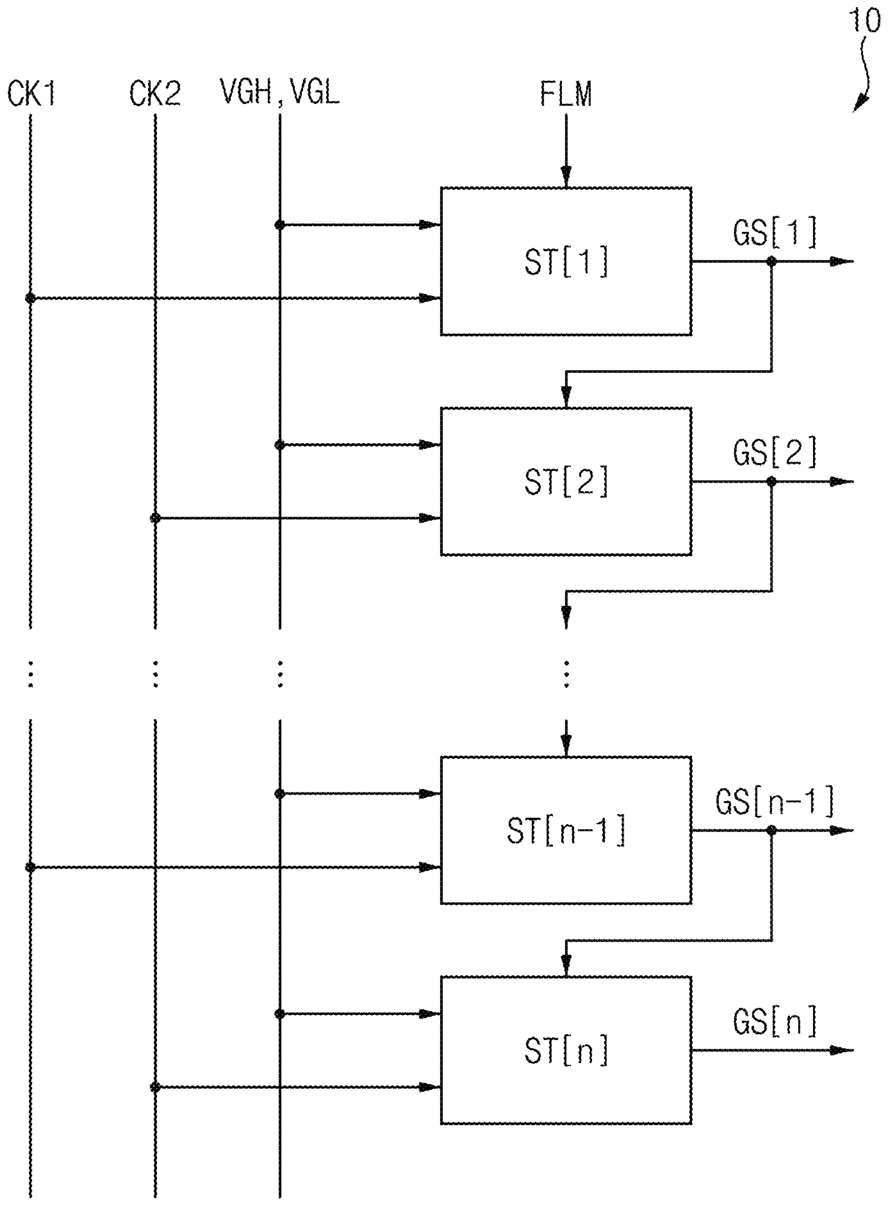
FIG. 1 is a block diagram showing a gate driver according to an embodiment.

Hereinafter, a gate driver, a display device, and an electronic apparatus according to embodiments of the present disclosure will be described in more detail with reference to the accompanying drawings. The same or similar reference numerals will be used for the same elements in the accompanying drawings.

FIG. 1 is a block diagram showing a gate driver 10 according to an embodiment.

Referring to FIG. 1, a gate driver 10 may receive a first clock signal CK1, a second clock signal CK2, a high gate voltage VGH, a first low gate voltage VGL, and a gate start signal FLM, and may output first to $n^{th}$ (n is a natural number greater than 1) gate signals GS[1], GS[2], . . . , GS[n−1], and GS[n]. The second clock signal CK2 may be a signal in which the first clock signal CK1 is shifted by half a period (e.g., 1 horizontal time) of the first clock signal CK1. The high gate voltage VGH may be a turn-off voltage of a P-type transistor (e.g., a PMOS transistor) and a turn-on voltage of an N-type transistor (e.g., an NMOS transistor). The first low gate voltage VGL may be a turn-on voltage of the P-type transistor and a turn-off voltage of the N-type transistor.

The gate driver 10 may include first to $n^{th}$ stages ST[1], ST[2], . . . , ST[n−1], and ST[n].

Each of the first to $n^{th}$ stages ST[1], ST[2], . . . , ST[n−1], and ST[n] may receive the high gate voltage VGH and the first low gate voltage VGL. Each of the first to $n^{th}$ stages ST[1], ST[2], . . . , ST[n−1], and ST[n] may receive the first clock signal CK1 or the second clock signal CK2. In an embodiment, each of odd-numbered stages ST[1], . . . , ST[n−1] may receive the first clock signal CK1, and each of even-numbered stages ST[2], . . . , ST[n] may receive the second clock signal CK2. The first stage ST[1] may receive the gate start signal FLM, and each of the second to $n^{th}$ stages ST[2], . . . , ST[n−1], and ST[n] may receive a gate signal output from a previous stage. The first to $n^{th}$ stages ST[1], ST[2], . . . , ST[n−1], and ST[n] may output the first to $n^{th}$ gate signals GS[1], GS[2], . . . , GS[n−1], and GS[n], respectively.

Figure 2:
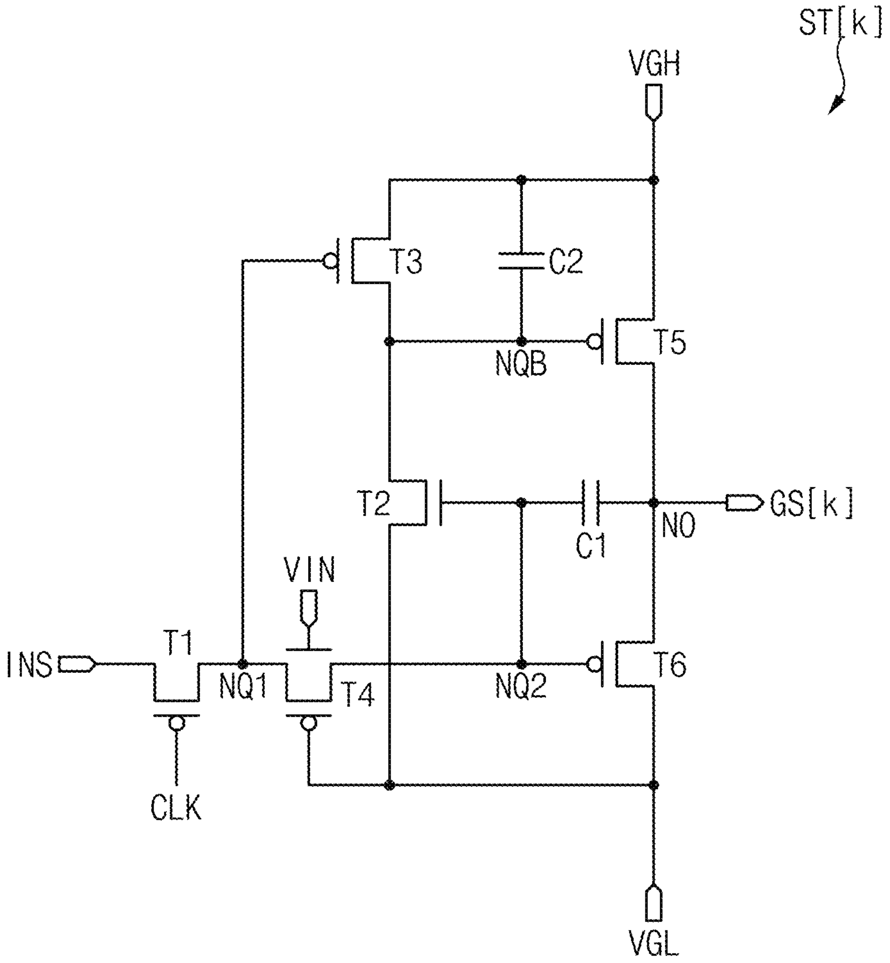
FIG. 2 is a circuit diagram showing an example of a $k^{th}$ stage included in the gate driver of FIG. 1.

FIG. 2 is a circuit diagram showing an example of a $k^{th}$ stage ST[k] included in the gate driver 10 of FIG. 1.

Referring to FIGS. 1 and 2, a $k^{th}$ stage ST[k] (k is a natural number greater than or equal to 1 and less than or equal to n) may receive an input signal INS, a clock signal CLK, the high gate voltage VGH, the first low gate voltage VGL, and an input voltage VIN, and may output a $k^{th}$ gate signal GS[k]. When the $k^{th}$ stage ST[k] is the first stage ST[1], the input signal INS may be the gate start signal FLM. When the $k^{th}$ stage ST[k] is one of the second to $n^{th}$ stages ST[2], . . . , ST[n−1], and ST[n], the input signal INS may be a $k-1^{th}$ gate signal output from a $k-1^{th}$ stage. When the $k^{th}$ stage ST[k] is one of the odd-numbered stages ST[1], . . . , ST[n−1], the clock signal CLK may be the first clock signal CK1. When the $k^{th}$ stage ST[k] is one of the even-numbered stages ST[2], . . . , ST[n], the clock signal CLK may be the second clock signal CK2.

The $k^{th}$ stage ST[k] may include a first transistor T1, a second transistor T2, a third transistor T3, a fourth transistor T4, a fifth transistor T5, a sixth transistor T6, a first capacitor C1, and a second capacitor C2. However, the number of transistors included in the $k^{th}$ stage ST[k] and the number of capacitors included in the $k^{th}$ stage ST[k] are not limited thereto.

The first transistor T1 may transmit the input signal INS to a first control node NQ1. In an embodiment, the first transistor T1 may include a gate receiving the clock signal CLK, a first terminal receiving the input signal INS, and a second terminal connected to the first control node NQ1. The first transistor T1 may transmit the input signal INS to the first control node NQ1 in response to the clock signal CLK.

The second transistor T2 may include a gate connected to a second control node NQ2, a first terminal receiving the first low gate voltage VGL, and a second terminal connected to an inverting control node NQB. The second transistor T2 may transmit the first low gate voltage VGL to the inverting control node NQB in response to a voltage of the second control node NQ2.

The third transistor T3 may include a gate connected to the first control node NQ1, a first terminal receiving the high gate voltage VGH, and a second terminal connected to the inverting control node NQB. The third transistor T3 may transmit the high gate voltage VGH to the inverting control node NQB in response to a voltage of the first control node NQ1.

The fourth transistor T4 may be connected between the first control node NQ1 and the second control node NQ2. The fourth transistor T4 may include a gate receiving the first low gate voltage VGL or a low gate voltage higher or lower than the first low gate voltage VGL, a first terminal connected to the first control node NQ1, a second terminal connected to the second control node NQ2, and a back gate receiving the input voltage VIN. As the first low gate voltage VGL is applied to the gate of the fourth transistor T4, the fourth transistor T4 may be an always-on transistor (AOT).

Although FIG. 2 illustrates an embodiment in which the gate of the fourth transistor T4 receives the first low gate voltage VGL, the present disclosure is not limited thereto. In another embodiment, the gate of the fourth transistor T4 may receive the low gate voltage that is higher or lower than the first low gate voltage VGL.

The fifth transistor T5 may include a gate connected to the inverting control node NQB, a first terminal receiving the high gate voltage VGH, and a second terminal connected to an output node NO. The gate signal GS[k] may be output from the output node NO. The fifth transistor T5 may transmit the high gate voltage VGH to the output node NO in response to a voltage of the inverting control node NQB. The fifth transistor T5 may be referred to as a first buffer transistor or a pull-up transistor.

The sixth transistor T6 may include a gate connected to the second control node NQ2, a first terminal receiving the first low gate voltage VGL or the clock signal CLK, and a second terminal connected to the output node NO. The sixth transistor T6 may transmit the first low gate voltage VGL to the output node NO in response to the voltage of the second control node NQ2. The sixth transistor T6 may be referred to as a second buffer transistor or a pull-down transistor.

Although FIG. 2 illustrates an embodiment in which the first terminal of the sixth transistor T6 receives the first low gate voltage VGL, the present disclosure is not limited thereto. In another embodiment, the first terminal of the sixth transistor T6 may receive the clock signal CLK.

The first capacitor C1 may include a first terminal connected to the second control node NQ2 and a second terminal connected to the output node NO. The first capacitor C1 may store a voltage difference between the second control node NQ2 and the output node NO.

The second capacitor C2 may include a first terminal receiving the high gate voltage VGH and a second terminal connected to the inverting control node NQB. The first capacitor C1 may store the voltage of the inverting control node NQB.

In an embodiment, each of the first transistor T1, the third transistor T3, the fourth transistor T4, the fifth transistor T5, and the sixth transistor T6 may be a P-type transistor, and the second transistor T2 may be an N-type transistor. However, the present disclosure is not limited thereto, and in another embodiment, at least one of the first transistor T1, the third transistor T3, the fourth transistor T4, the fifth transistor T5, and the sixth transistor T6 may be the N-type transistor, and the second transistor T2 may be the P-type transistor.

Figure 3:
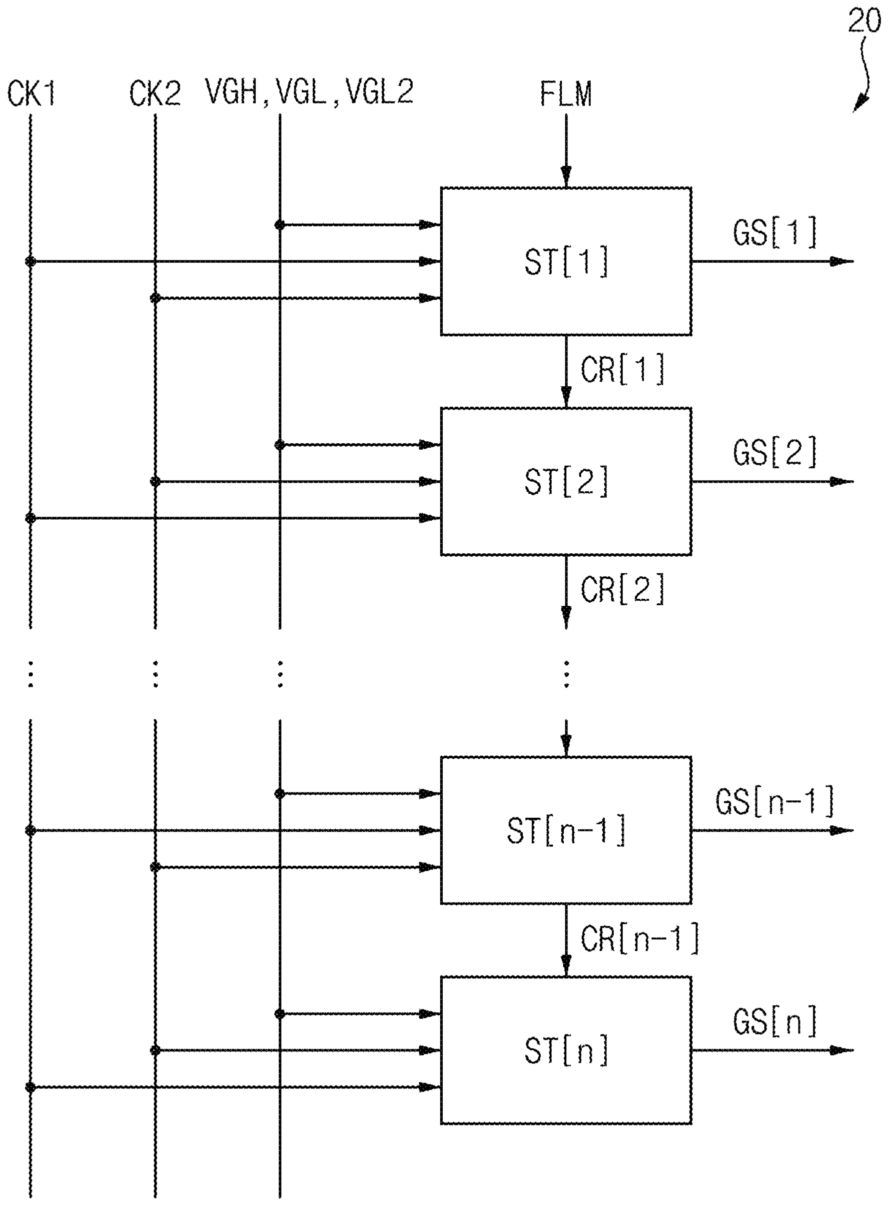
FIG. 3 is a block diagram showing a gate driver according to an embodiment.

FIG. 3 is a block diagram showing a gate driver 20 according to an embodiment.

Descriptions of components of a gate driver 20 described with reference to FIG. 3, which are substantially the same as or similar to those of the gate driver 10 described with reference to FIG. 1, are omitted.

Referring to FIG. 3, a gate driver 20 may receive a first clock signal CK1, a second clock signal CK2, a high gate voltage VGH, a first low gate voltage VGL, a second low gate voltage VGL2, and a gate start signal FLM, and may output first to n$^{th}$ gate signals GS[1], GS[2], . . . , GS[n−1], and GS[n], and first to n−1$^{th}$ carry signals CR[1], CR[2], . . . , CR[n−1]. The second low gate voltage VGL2 may be the turn-on voltage of the P-type transistor and the turn-off voltage of the N-type transistor. In an embodiment, a voltage level of the second low gate voltage VGL2 may be different from a voltage level of the first low gate voltage VGL1.

The gate driver 20 may include first to n$^{th}$ stages ST[1], ST[2], . . . , ST[n−1], and ST[n].

Each of the first to n$^{th}$ stages ST[1], ST[2], . . . , ST[n−1], and ST[n] may receive the high gate voltage VGH, the first low gate voltage VGL, the second low gate voltage VGL2, the first clock signal CK1, and the second clock signal CK2. The first stage ST[1] may receive the gate start signal FLM, and each of the second to n$^{th}$ stages ST[2], . . . , ST[n−1], and ST[n] may receive a carry signal output from a previous stage. The first to n−1$^{th}$ stages ST[1], ST[2], . . . , ST[n−1] may output the first to n−1$^{th}$ carry signals CR[1], CR[2], . . . , CR[n−1], respectively.

Figure 4:
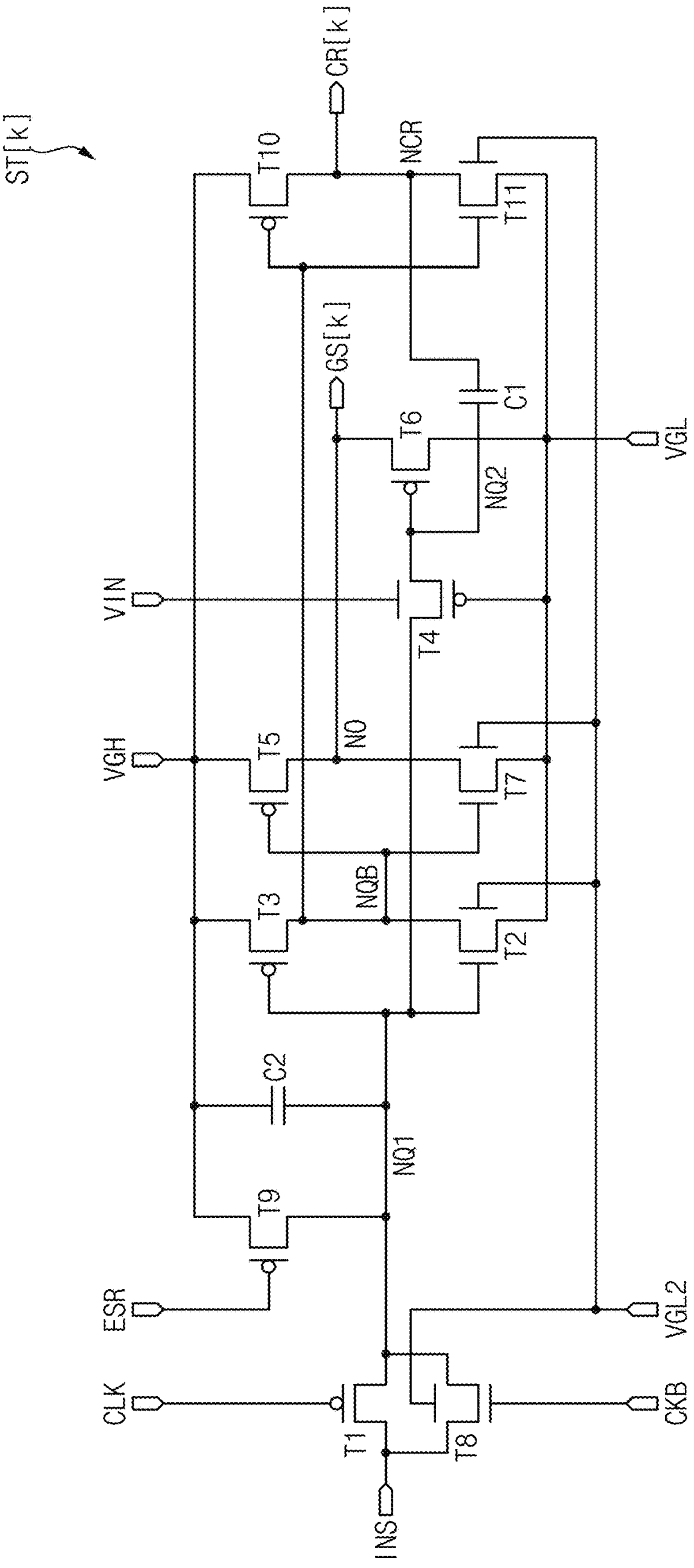
FIG. 4 is a circuit diagram showing an example of a $k^{th}$ stage included in the gate driver of FIG. 3.

FIG. 4 is a circuit diagram showing an example of a k$^{th}$ stage ST[k] included in the gate driver 20 of FIG. 3.

Descriptions of components of a k$^{th}$ stage ST[k] described with reference to FIG. 4, which are substantially the same as or similar to those of the k$^{th}$ stage ST[k] described with reference to FIG. 2, are omitted.

Referring to FIGS. 3 and 4, a k$^{th}$ stage ST[k] may receive an input signal INS, a clock signal CLK, an inverting clock signal CKB, the high gate voltage VGH, the first low gate voltage VGL, the second low gate voltage VGL2, a reset signal ESR, and an input voltage VIN, and may output a k$^{th}$ gate signal GS[k] and a k$^{th}$ carry signal CR[k]. When the k$^{th}$ stage ST[k] is the first stage ST[1], the input signal INS may be the gate start signal FLM. When the k$^{th}$ stage ST[k] is one of the second to n$^{th}$ stages ST[2], . . . , ST[n−1], and ST[n], the input signal INS may be a k−1$^{th}$ carry signal output from a k−1$^{th}$ stage. When the k$^{th}$ stage ST[k] is one of odd-numbered stages ST[1], . . . , ST[n−1], the clock signal CLK may be the first clock signal CK1, and the inverting clock signal CKB may be the second clock signal CK2. When the k$^{th}$ stage ST[k] is one of even-numbered stages ST[2], . . . , ST[n], the clock signal CLK may be the second clock signal CK2, and the inverting clock signal CKB may be the first clock signal CK1.

The k$^{th}$ stage ST[k] may include a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, an eleventh transistor T11, a first capacitor C1, and a second capacitor C2. However, the number of transistors included in the k$^{th}$ stage ST[k] and the number of capacitors included in the k$^{th}$ stage ST[k] are not limited to what is shown in the embodiment of FIG. 4.

The second transistor T2 may include a gate connected to a first control node NQ1, a first terminal receiving the first low gate voltage VGL, and a second terminal connected to an inverting control node NQB. In an embodiment, the second transistor T2 may further include a back gate receiving the second low gate voltage VGL2. The second transistor T2 may transmit the first low gate voltage VGL to the inverting control node NQB in response to a voltage of the first control node NQ1.

The seventh transistor T7 may include a gate connected to the inverting control node NQB, a first terminal receiving the first low gate voltage VGL, and a second terminal connected to an output node NO. In an embodiment, the seventh transistor T7 may further include a back gate receiving the second low gate voltage VGL2. The seventh transistor T7 may transmit the first low gate voltage VGL to the output node NO in response to a voltage of the inverting control node NQB. The seventh transistor T7 may be referred to as a third buffer transistor or a pull-down transistor.

The eighth transistor T8 may include a gate receiving the inverting clock signal CKB, a first terminal receiving the input signal INS, and a second terminal connected to the first control node NQ1. In an embodiment, the eighth transistor T8 may further include a back gate receiving the second low gate voltage VGL2. The eighth transistor T8 may transmit the input signal INS to the first control node NQ1 in response to the inverting clock signal CKB.

The ninth transistor T9 may include a gate receiving the reset signal ESR, a first terminal receiving the high gate voltage VGH, and a second terminal connected to the first control node NQ1. The ninth transistor T9 may transmit the high gate voltage VGH to the first control node NQ1 in response to the reset signal ESR.

The tenth transistor T10 may include a gate connected to the inverting control node NQB, a first terminal receiving the high gate voltage VGH, and a second terminal connected to a carry output node NCR. The carry signal CR[k] may be output from the carry output node NCR. The tenth transistor T10 may transmit the high gate voltage VGH to the carry output node NCR in response to the voltage of the inverting control node NQB.

The eleventh transistor T11 may include a gate connected to the inverting control node NQB, a first terminal receiving the first low gate voltage VGL, and a second terminal connected to the carry output node NCR. In an embodiment, the eleventh transistor T11 may further include a back gate receiving the second low gate voltage VGL2. The eleventh transistor T11 may transmit the first low gate voltage VGL to the carry output node NCR in response to the voltage of the inverting control node NQB.

The first capacitor C1 may include a first terminal connected to a second control node NQ2 and a second terminal connected to the carry output node NCR. The first capacitor C1 may store a voltage difference between the second control node NQ2 and the carry output node NCR.

The second capacitor C2 may include a first terminal receiving the high gate voltage VGH and a second terminal connected to the first control node NQ1. The second capacitor C2 may store a voltage of the first control node NQ1.

In an embodiment, each of the first transistor T1, the third transistor T3, the fourth transistor T4, the fifth transistor T5, the sixth transistor T6, the ninth transistor T9, and the tenth transistor T10 may be a P-type transistor, and each of the second transistor T2, the seventh transistor T7, the eighth transistor T8, and the eleventh transistor T11 may be an N-type transistor. However, the present disclosure is not limited thereto, and in another embodiment, at least one of the first transistor T1, the third transistor T3, the fourth transistor T4, the fifth transistor T5, the sixth transistor T6, the ninth transistor T9, and the tenth transistor T10 may be an N-type transistor, and at least one of the second transistor T2, the seventh transistor T7, the eighth transistor T8, and the eleventh transistor T11 may be a P-type transistor.

Figure 5:
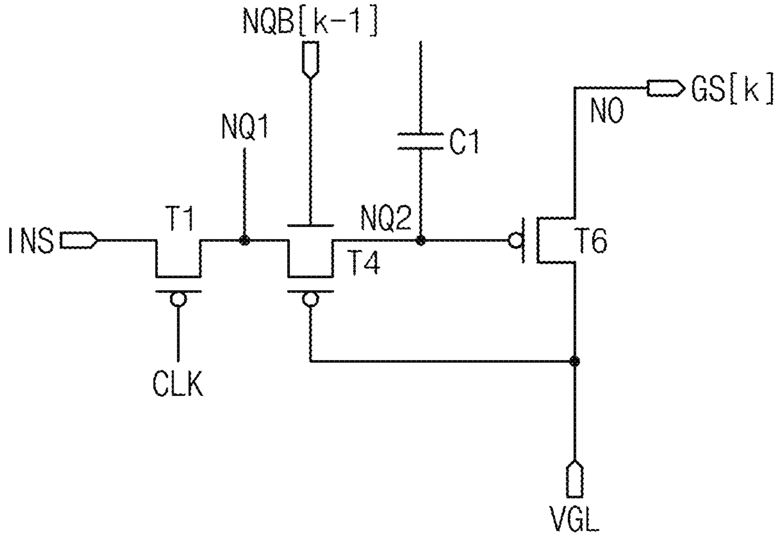
FIG. 5 is a circuit diagram showing an example of a common portion of the $k^{th}$ stages of FIGS. 2 and 4.
Figure 6:
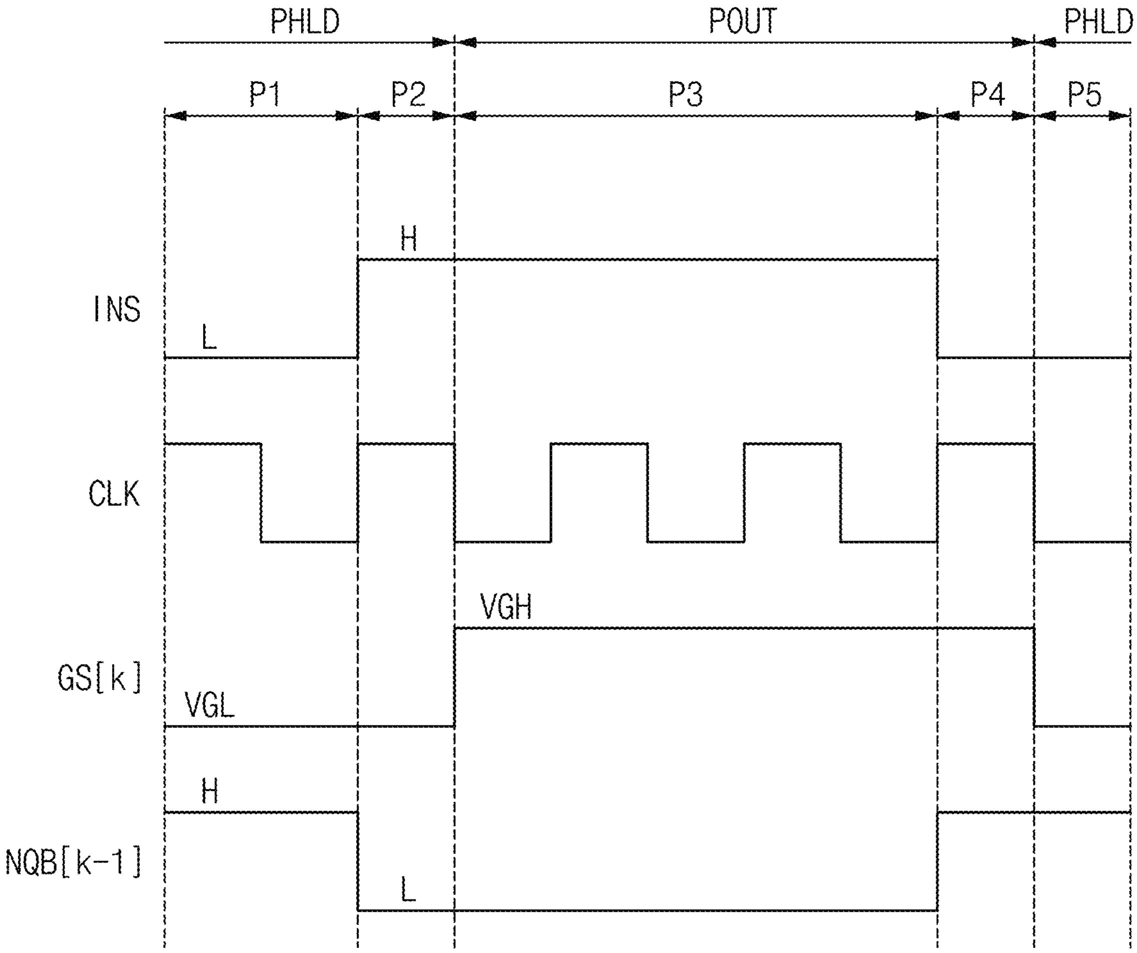
FIG. 6 is a timing diagram for describing an operation of the common portion of FIG. 5.

FIG. 5 is a circuit diagram showing an example of a common portion of the $k^{th}$ stages ST[k] of FIGS. 2 and 4. FIG. 6 is a timing diagram for describing an operation of the common portion of FIG. 5.

Referring to FIGS. 5 and 6, the back gate of the fourth transistor T4 of the $k^{th}$ stage ST[k] may receive a voltage of the inverting control node NQB[k−1] of the $k-1^{th}$ stage ST[k−1] (hereinafter, a previous inverting control node). The voltage of the previous inverting control node NQB[k−1] may be a variable voltage that changes between a high voltage H and a low voltage L. Accordingly, a variable voltage may be applied to the back gate of the fourth transistor T4 of the $k^{th}$ stage ST[k]. In other words, the input voltage VIN of FIGS. 2 and 4 may be a variable voltage.

A frame period may include a hold period PHLD and an output period POUT. The hold period PHLD may be a period in which the gate signal GS[k] has the first low gate voltage VGL, and the output period POUT may be a period in which the gate signal GS[k] has the high gate voltage VGH. The hold period PHLD may include a first period P1, a second period P2, and a fifth period P5, and the output period POUT may include a third period P3 and a fourth period P4.

In the first period P1, the voltage of the first control node NQ1 may be the low voltage L, the voltage of the second control node NQ2 may be a voltage lower than the low voltage L, and the voltage of the previous inverting control node NQB[k−1] may be the high voltage H. Accordingly, the voltage of the back gate of the fourth transistor T4 may be higher than the voltages of the first terminal and the second terminal of the fourth transistor T4, and a threshold voltage of the fourth transistor T4 may be negatively shifted.

In the second period P2, the input voltage INS may transition from the low voltage L to the high voltage H, and the voltage of the previous inverting control node NQB[k−1] may transition from the high voltage H to the low voltage L. Accordingly, the voltage of the back gate of the fourth transistor T4 may be lowered to a voltage substantially equal to the voltage of the first terminal of the fourth transistor T4, and the threshold voltage of the fourth transistor T4 may be negatively shifted and then may not be shifted.

In the third period P3, the voltage of the first control node NQ1 and the voltage of the second control node NQ2 may transition to the high voltage H. Accordingly, the voltage of the back gate of the fourth transistor T4 may be lower than the voltages of the first terminal and the second terminal of the fourth transistor T4, and the threshold voltage of the fourth transistor T4 may be positively shifted.

In the fourth period P4, the input voltage INS may transition from the high voltage H to the low voltage L, and the voltage of the previous inverting control node NQB[k−1] may transition from the low voltage L to the high voltage H. Accordingly, the voltage of the back gate of the fourth transistor T4 may increase to a voltage substantially equal to the voltages of the first terminal and the second terminal of the fourth transistor T4, and the threshold voltage of the fourth transistor T4 may be positively shifted and then may not be shifted.

In the fifth period P5, the voltage of the first control node NQ1 may transition to the low voltage L, and the voltage of the second control node NQ2 may transition to a voltage lower than the low voltage L. Accordingly, the voltage of the back gate of the fourth transistor T4 may be higher than the voltages of the first terminal and the second terminal of the fourth transistor T4, and the threshold voltage of the fourth transistor T4 may be negatively shifted.

The threshold voltage of the fourth transistor T4 may be negatively shifted in the first period P1 and the fifth period P5, and the threshold voltage of the fourth transistor T4 may be negatively shifted and then may not be shifted in the second period P2. Accordingly, in the hold period PHLD, the threshold voltage of the fourth transistor T4 may be negatively shifted. When the threshold voltage of the fourth transistor T4, which is a P-type transistor, is negatively shifted, a magnitude of the threshold voltage of the fourth transistor T4 may increase, and a leakage current of the fourth transistor T4 may decrease.

The threshold voltage of the fourth transistor T4 may be positively shifted in the third period P3, and the threshold voltage of the fourth transistor T4 may be positively shifted and then may not be shifted in the fourth period P4. Accordingly, the threshold voltage of the fourth transistor T4 may be positively shift in the output period POUT. When the threshold voltage of the fourth transistor T4, which is a P-type transistor, is positively shifted, the magnitude of the threshold voltage of the fourth transistor T4 may decrease, and the sixth transistor T6, whose gate is connected to the second terminal of the fourth transistor T4, may be quickly turned-on or turned-off.

Figure 7:
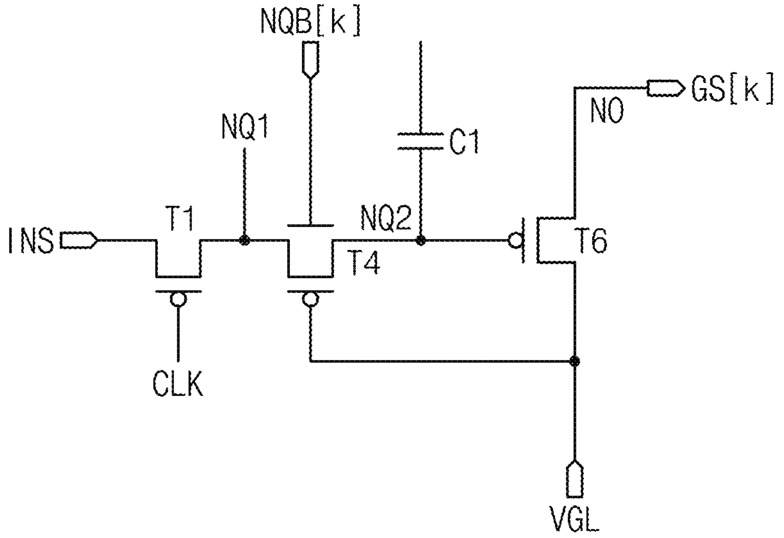
FIG. 7 is a circuit diagram showing an example of the common portion of the $k^{th}$ stages of FIGS. 2 and 4.

FIG. 7 is a circuit diagram showing an example of the common portion of the $k^{th}$ stages ST[k] of FIGS. 2 and 4.

Referring to FIG. 7, the back gate of the fourth transistor T4 of the $k^{th}$ stage ST[k] may receive the voltage of the inverting control node NQB[k] of the $k^{th}$ stage ST[k] (hereinafter, referred to as a current inverting control node). The voltage of the current inverting control node NQB[k] may be a variable voltage that changes between the high voltage H and the low voltage L. Accordingly, a variable voltage may be applied to the back gate of the fourth transistor T4 of the $k^{th}$ stage ST[k]. In other words, the input voltage VIN of FIGS. 2 and 4 may be a variable voltage.

Figure 8:
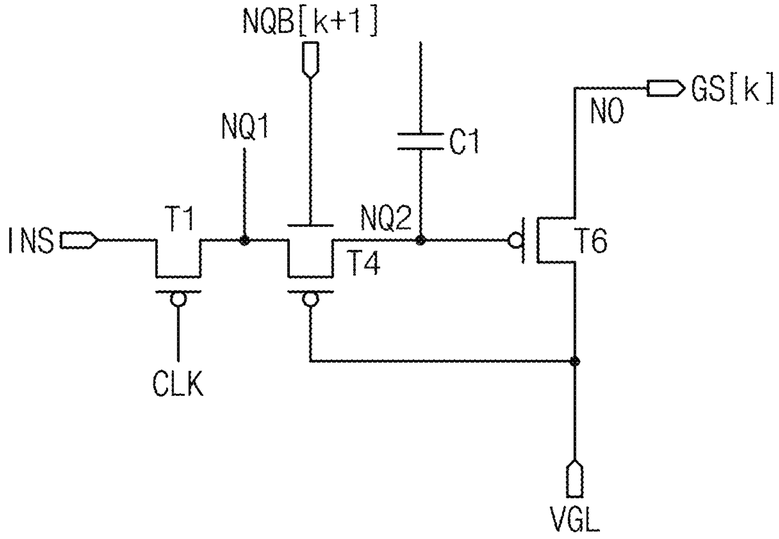
FIG. 8 is a circuit diagram showing an example of the common portion of the $k^{th}$ stages of FIGS. 2 and 4.

FIG. 8 is a circuit diagram showing an example of the common portion of the $k^{th}$ stages ST[k] of FIGS. 2 and 4.

Referring to FIG. 8, the back gate of the fourth transistor T4 of the $k^{th}$ stage ST[k] may receive the voltage of the inverting control node NQB[k+1] of a $k+1^{th}$ stage ST[k+1] (hereinafter, referred to as a subsequent inverting control node). The voltage of the subsequent inverting control node NQB[k+1] may be a variable voltage that changes between the high voltage H and the low voltage L. Accordingly, a variable voltage may be applied to the back gate of the fourth transistor T4 of the $k^{th}$ stage ST[k]. In other words, the input voltage VIN of FIGS. 2 and 4 may be a variable voltage.

Figure 9:
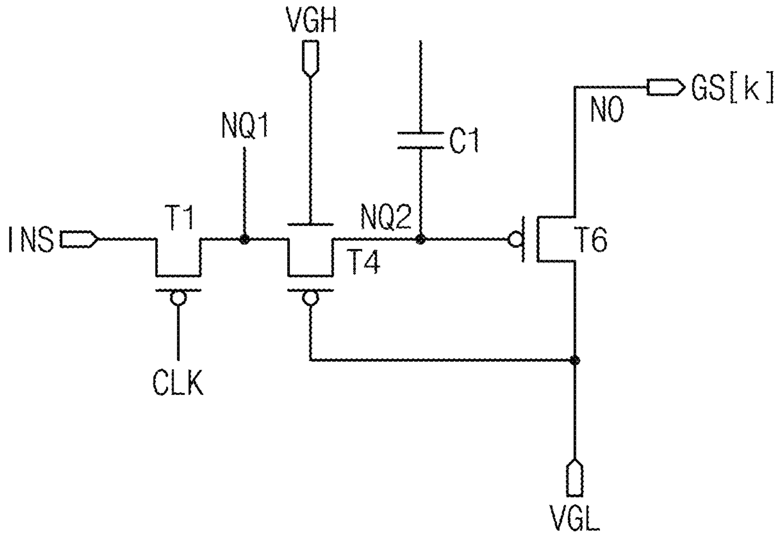
FIG. 9 is a circuit diagram showing an example of the common portion of the $k^{th}$ stages of FIGS. 2 and 4.
Figure 10:
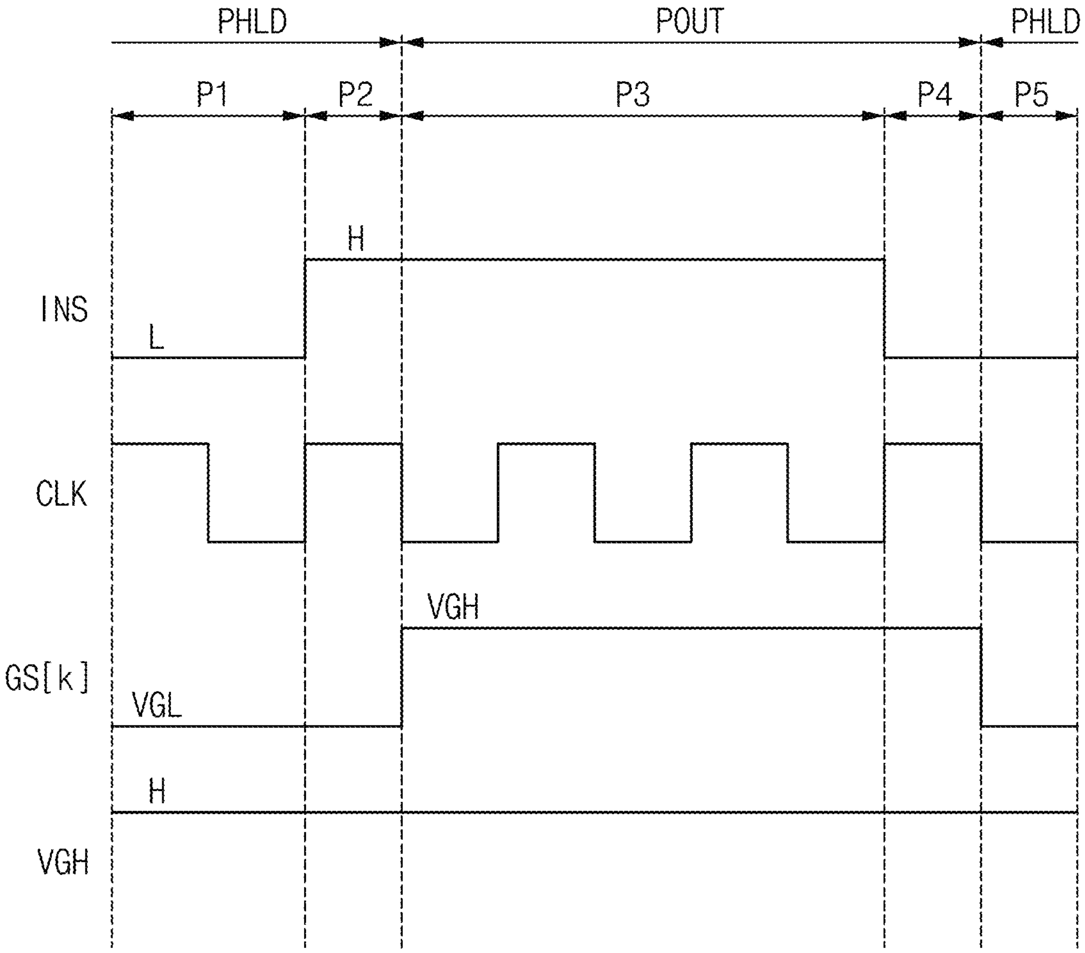
FIG. 10 is a timing diagram for describing an operation of the common portion of FIG. 9.

FIG. 9 is a circuit diagram showing an example of the common portion of the $k^{th}$ stages ST[k] of FIGS. 2 and 4. FIG. 10 is a timing diagram for describing an operation of the common portion of FIG. 9.

Referring to FIGS. 9 and 10, the back gate of the fourth transistor T4 of the $k^{th}$ stage ST[k] may receive the high gate voltage VGH or a voltage higher or lower than the high gate voltage VGH. Accordingly, a constant voltage may be applied to the back gate of the fourth transistor T4 of the $k^{th}$ stage ST[k]. In other words, the input voltage VIN of FIGS. 2 and 4 may be a constant voltage.

Although FIG. 9 illustrates an embodiment in which the back gate of the fourth transistor T4 receives the high gate voltage VGH, the present disclosure is not limited thereto. In another embodiment, the back gate of the fourth transistor T4 may receive the voltage higher or lower than the high gate voltage VGH.

A frame period may include a hold period PHLD and an output period POUT. The hold period PHLD may be a period in which the gate signal GS[k] has the first low gate voltage VGL, and the output period POUT may be a period in which the gate signal GS[k] has the high gate voltage VGH. The hold period PHLD may include a first period P1, a second period P2, and a fifth period P5, and the output period POUT may include a third period P3 and a fourth period P4.

In the first period P1, the voltage of the first control node NQ1 may be the low voltage L, the voltage of the second control node NQ2 may be a voltage lower than the low voltage L, and the high gate voltage VGH may be the high voltage H. Accordingly, the voltage of the back gate of the fourth transistor T4 may be higher than the voltages of the first terminal and the second terminal of the fourth transistor T4, and the threshold voltage of the fourth transistor T4 may be negatively shifted.

In the second period P2, the input voltage INS may transition from the low voltage L to the high voltage H, and the voltages of the first control node NQ1 and the second control node NQ2 may be maintained. Accordingly, the voltage of the back gate of the fourth transistor T4 may be higher than the voltages of the first terminal and the second terminal of the fourth transistor T4, and the threshold voltage of the fourth transistor T4 may be negatively shifted.

In the third period P3, the voltage of the first control node NQ1 and the voltage of the second control node NQ2 may transition to the high voltage H. Accordingly, the voltage of the back gate of the fourth transistor T4 may be substantially equal to the voltages of the first terminal and the second terminal of the fourth transistor T4, and the threshold voltage of the fourth transistor T4 may not be shifted.

In the fourth period P4, the input voltage INS may transition from the high voltage H to the low voltage L, and the voltages of the first control node NQ1 and the second control node NQ2 may be maintained. Accordingly, the voltage of the back gate of the fourth transistor T4 may be substantially equal to the voltages of the first terminal and the second terminal of the fourth transistor T4, and the threshold voltage of the fourth transistor T4 may not be shifted.

In the fifth period P5, the voltage of the first control node NQ1 may transition to the low voltage L, and the voltage of the second control node NQ2 may transition to a voltage lower than the low voltage L. Accordingly, the voltage of the back gate of the fourth transistor T4 may be higher than the voltages of the first terminal and the second terminal of the fourth transistor T4, and the threshold voltage of the fourth transistor T4 may be negatively shifted.

The threshold voltage of the fourth transistor T4 may be negatively shifted in the first period P1, the second period P2, and the fifth period P5, and accordingly, the threshold voltage of the fourth transistor T4 may be negatively shifted in the hold period PHLD. When the threshold voltage of the fourth transistor T4, which is a P-type transistor, is negatively shifted, the magnitude of the threshold voltage of the fourth transistor T4 may increase, and the leakage current of the fourth transistor T4 may decrease.

The threshold voltage of the fourth transistor T4 may not be shifted in the third period P3 and the fourth period P4, and accordingly, the threshold voltage of the fourth transistor T4 may not be shifted in the output period POUT.

Figure 11:
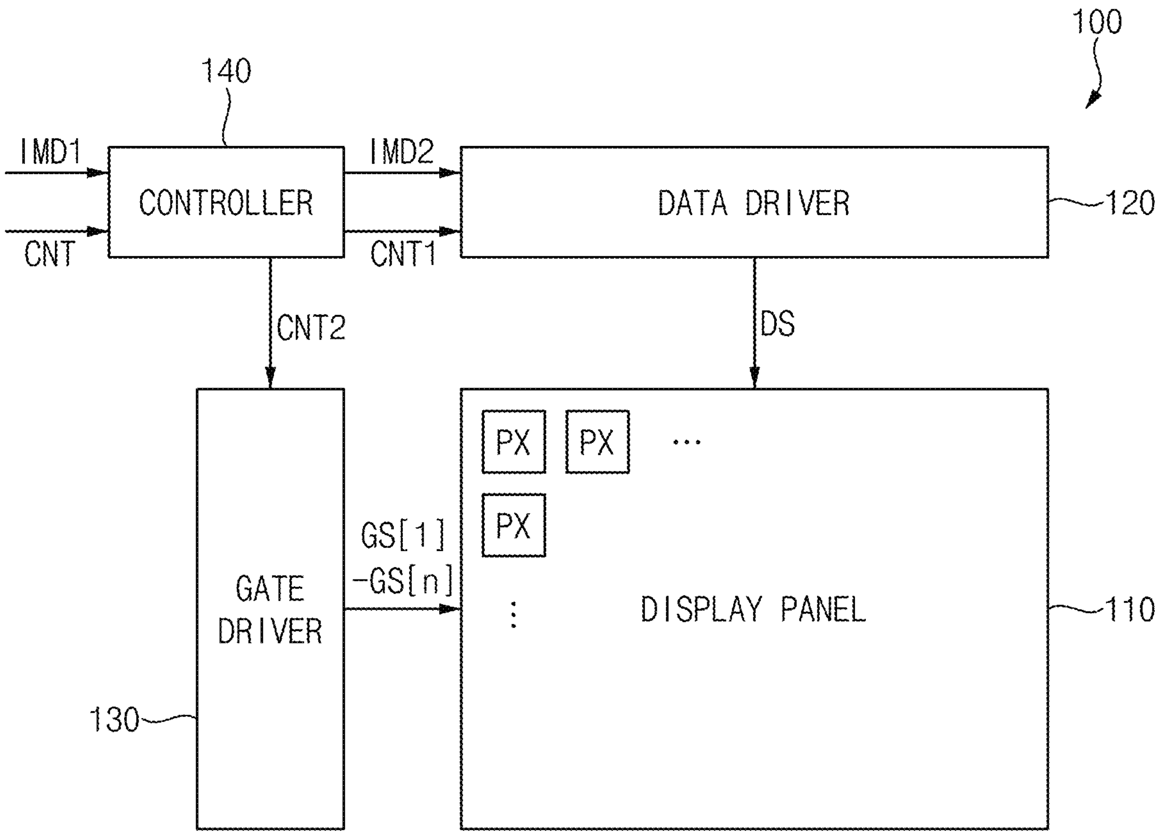
FIG. 11 is a block diagram showing a display device according to an embodiment.

FIG. 11 is a block diagram showing a display device 100 according to an embodiment.

Referring to FIG. 11, a display device 100 may include a display panel 110, a data driver 120, a gate driver 130, and a controller 140.

The display panel 110 may include pixels PX. The pixels PX may display an image based on gate signals GS[1]-GS[n] and data signals DS.

The data driver 120 may provide the data signals DS to the pixels PX. The data driver 120 may generate the data signals DS based on second image data IMD2 and a data control signal CNT1. The second image data IMD2 may include a plurality of grayscale values corresponding to the pixels PX. The data control signal CNT1 may include an output data enable signal, a horizontal start signal, a load signal, etc.

The gate driver 130 may provide the gate signals GS[1]-GS[n] to the pixels PX. The gate driver 130 may generate the gate signals GS[1]-GS[n] based on a gate control signal CNT2. The gate control signal CNT2 may include the first clock signal CK1 of FIGS. 1 and 3, the second clock signal CK2 of FIGS. 1 and 3, the gate start signal FLM of FIGS. 1 and 3, etc.

Although FIG. 11 illustrates an embodiment in which the display device 10 includes one gate driver 130, the present disclosure is not limited thereto. In another embodiment, the display device 10 may include a first gate driver (or scan driver) and a second gate driver (or emission driver).

The controller 140 may control an operation (or driving) of the data driver 120 and an operation (or driving) of the gate driver 130. The controller 140 may output the second image data IMD2 and the data control signal CNT1 to the data driver 120, and may output the gate control signal CNT2 to the gate driver 130. The controller 140 may generate the second image data IMD2, the data control signal CNT1, and the gate control signal CNT2 based on first image data IMD1 and a controller control signal CNT. The first image data IMD1 may include a plurality of grayscale values corresponding to the pixels PX. The controller control signal CNT may include a master clock signal, a vertical start signal, a horizontal start signal, an input data enable signal, etc.

Figure 12:
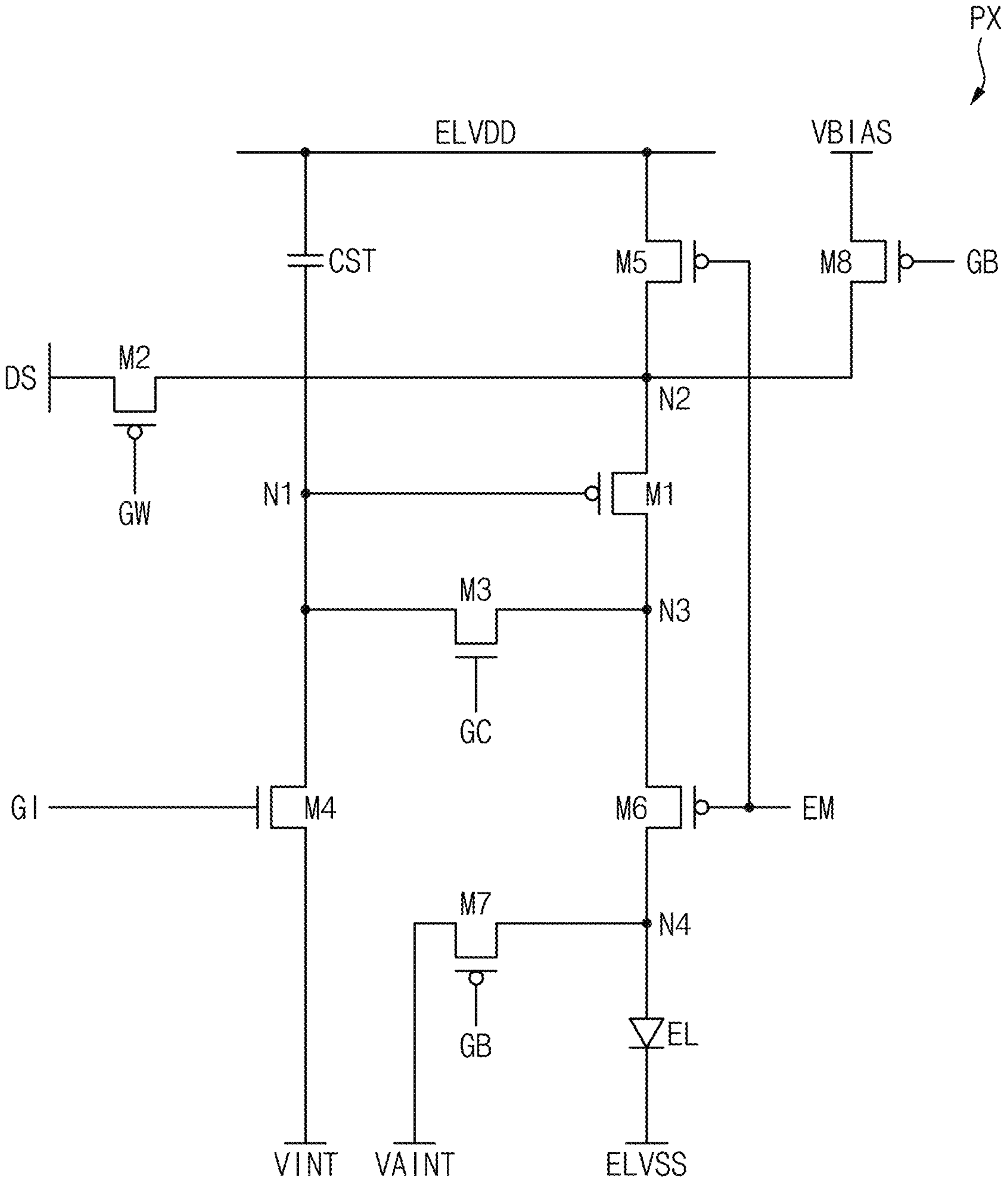
FIG. 12 is a circuit diagram showing an example of a pixel included in the display device of FIG. 11.

FIG. 12 is a circuit diagram showing an example of the pixel PX included in the display device 100 of FIG. 11.

Referring to FIGS. 11 and 12, the pixel PX may receive the data signal DS, a writing gate signal GW, a compensation gate signal GC, an initialization gate signal GI, an emission signal EM, a bypass gate signal GB, a first initialization voltage VINT, a second initialization voltage VAINT, a first power voltage ELVDD, and a second power voltage ELVSS. In an embodiment, the gate signal GS may be one of the compensation gate signal GC, the initialization gate signal GI, the emission signal EM, and the bypass gate signal GB.

The pixel PX may include a driving transistor M1, a writing transistor M2, a compensation transistor M3, an initialization transistor M4, a first emission transistor M5, a second emission transistor M6, a bypass transistor M7, a bias transistor M8, a storage capacitor CST, and a light-emitting element EL.

The driving transistor M1 may include a gate connected to a first node N1, a first terminal connected to a second node N2, and a second terminal connected to a third node N3. The driving transistor M1 may generate a driving current corresponding to a voltage difference between the first node N1 and the second node N2.

The writing transistor M2 may include a gate receiving the writing gate signal GW, a first terminal receiving the data signal DS, and a second terminal connected to the second node N2. The writing transistor M2 may transmit the data signal DS to the second node N2 in response to the writing gate signal GW.

The compensation transistor M3 may include a gate receiving the compensation gate signal GC, a first terminal connected to the third node N3, and a second terminal connected to the first node N1. The compensation transistor M3 may connect the first node N1 and the third node N3 in response to the compensation gate signal GC.

The initialization transistor M4 may include a gate receiving the initialization gate signal GI, a first terminal receiving the first initialization voltage VINT, and a second terminal connected to the first node N1. The initialization transistor M4 may transmit the first initialization voltage VINT to the first node N1 in response to the initialization gate signal GI.

The first emission transistor M5 may include a gate receiving the emission signal EM, a first terminal receiving the first power voltage ELVDD, and a second terminal connected to the second node N2. The first emission transistor M5 may transmit the first power voltage ELVDD to the second node N2 in response to the emission signal EM.

The second emission transistor M6 may include a gate receiving the emission signal EM, a first terminal connected to the third node N3, and a second terminal connected to a fourth node N4. The second emission transistor M6 may connect the third node N3 and the fourth node N4 in response to the emission signal EM.

The bypass transistor M7 may include a gate receiving the bypass gate signal GB, a first terminal receiving the second initialization voltage VAINT, and a second terminal connected to the fourth node N4. The bypass transistor M7 may transmit the second initialization voltage VAINT to the fourth node N4 in response to the bypass gate signal GB.

The bias transistor M8 may include a gate receiving the bypass gate signal GB, a first terminal receiving the bias voltage VBIAS, and a second terminal connected to the second node N2. The bias transistor M8 may transmit the bias voltage VBIAS to the second node N2 in response to the bypass gate signal GB.

The storage capacitor CST may include a first terminal receiving the first power voltage ELVDD and a second terminal connected to the first node N1. The storage capacitor CST may store a voltage of the first node N1.

The light-emitting element EL may include a first terminal (e.g., an anode) connected to the fourth node N4 and a second terminal (e.g., a cathode) receiving the second power voltage ELVSS. The light-emitting element EL may emit light corresponding to the driving current generated from the driving transistor M1.

Figure 13:
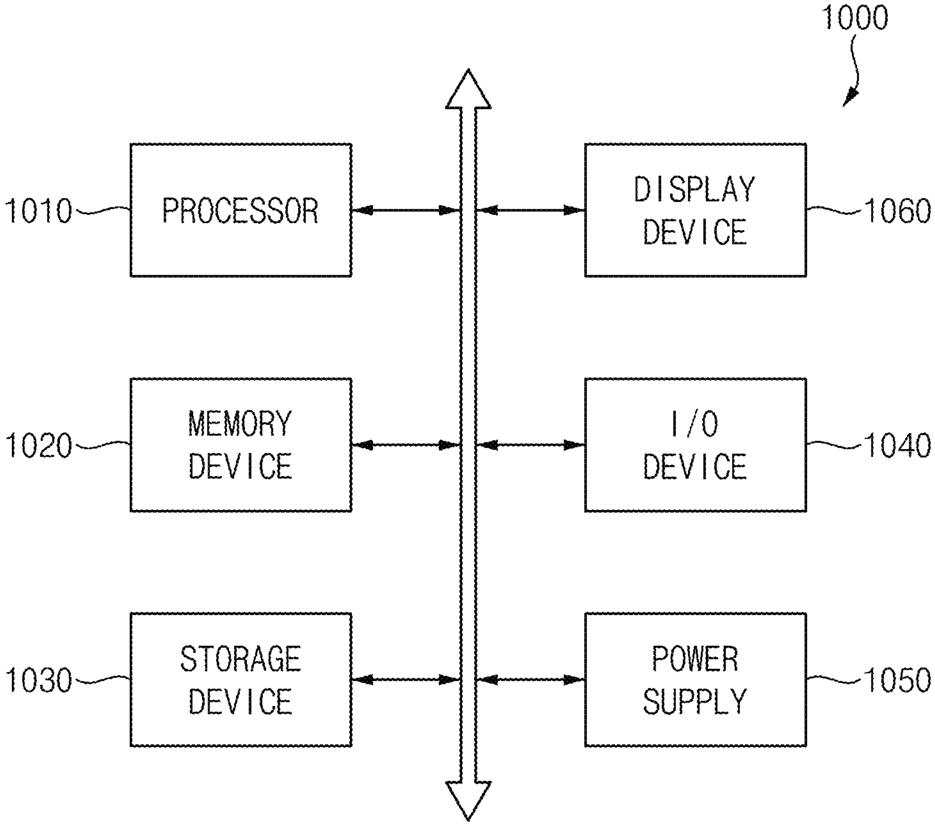
FIG. 13 is a block diagram showing an electronic apparatus according to an embodiment.

FIG. 13 is a block diagram showing an electronic apparatus 1000 according to an embodiment.

Referring to FIG. 13, an electronic apparatus 1000 may include a processor 1010, a memory device 1020, a storage device 1030, an input/output (I/O) device 1040, a power supply 1050, and a display device 1060. The electronic apparatus 1000 may further include a plurality of ports capable of communicating with a video card, a sound card, a memory card, a USB device, and the like, or communicating with other systems.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be connected to an expansion bus such as a peripheral component interconnect (PCI) bus. The processor 1010 may control the display device 1060.

The processor 1010 may control the display device 1060. In an embodiment, the processor 1010 may provide the first image data IMD1 of FIG. 11 and the controller control signal CNT of FIG. 11 to the display device 1060.

The memory device 1020 may store data required for an operation of the electronic apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may supply a power required for the operation of the electronic apparatus 1000. The display device 1060 may display an image. The display device 1060 may be connected to other components through the buses or other communication links. The display device 1060 may correspond to the display device 100 of FIG. 1.

In a gate driver included in the display device 1060, a threshold voltage of a fourth transistor which is an always-on transistor (AOT) may be negatively shifted in a hold period in which a gate signal has a low gate voltage, and thus, leakage current of the fourth transistor may be reduced. Further, the threshold voltage of the fourth transistor may not be shifted or may be positively shifted in an output period in which the gate signal has a high gate voltage, and thus, a sixth transistor which is a buffer transistor may be quickly turned-on or turned-off. Accordingly, reliability of the gate driver may be improved.

The display device according to the embodiments may be applied to a display device included in a computer, a notebook, a mobile phone, a smart phone, a smart pad, a smart watch, a PMP, a PDA, an MP3 player, or the like.

Although the gate driver, the display device, and the electronic apparatus according to the embodiments have been described with reference to the drawings, the shown embodiments are examples, and may be modified and changed by a person having ordinary knowledge in the relevant technical field without departing from the technical spirit described in the following claims.

What is claimed is:

1. A gate driver comprising:

first to $n^{th}$ stages, wherein n is a natural number greater than 1 and k is a natural number between 1 and n, wherein a $k^{th}$ stage of the first to $n^{th}$ stages has:

a first transistor which transmits an input signal to a first control node;

a fifth transistor including a gate connected to an inverting control node, a first terminal which receives a high gate voltage, and a second terminal connected to an output node which outputs a gate signal;

a sixth transistor including a gate connected to a second control node, a first terminal which receives a first low gate voltage or a clock signal, and a second terminal connected to the output node; and a fourth transistor connected between the first control node and the second control node, the fourth transistor including a gate which receives the first low gate voltage or a low gate voltage higher or lower than the first low gate voltage and a back gate which receives an input voltage that is a variable voltage.

2. The gate driver of claim 1, wherein the input voltage is a voltage of the inverting control node of a $k-1^{th}$ stage, the $k^{th}$ stage, or a $k+1^{th}$ stage.

3. The gate driver of claim 1, wherein the $k^{th}$ stage further comprises:

a second transistor including a gate connected to the second control node, a first terminal which receives the first low gate voltage, and a second terminal connected to the inverting control node;

a third transistor including a gate connected to the first control node, a first terminal which receives the high gate voltage, and a second terminal connected to the inverting control node;

a first capacitor including a first terminal connected to the second control node and a second terminal connected to the output node; and a second capacitor including a first terminal which receives the high gate voltage and a second terminal connected to the inverting control node.

4. The gate driver of claim 1, wherein the $k^{th}$ stage further comprises:

a second transistor including a gate connected to the first control node, a first terminal which receives the first low gate voltage, and a second terminal connected to the inverting control node;

a third transistor including a gate connected to the first control node, a first terminal which receives the high gate voltage, and a second terminal connected to the inverting control node;

a seventh transistor including a gate connected to the inverting control node, a first terminal which receives the first low gate voltage, and a second terminal connected to the output node;

an eighth transistor including a gate which receives an inverting clock signal, a first terminal which receives the input signal, and a second terminal connected to the first control node;

a tenth transistor including a gate connected to the inverting control node, a first terminal which receives the high gate voltage, and a second terminal connected to a carry output node which outputs a carry signal;

an eleventh transistor including a gate connected to the inverting control node, a first terminal which receives the first low gate voltage, and a second terminal connected to the carry output node;

a first capacitor including a first terminal connected to the second control node and a second terminal connected to the carry output node; and a second capacitor including a first terminal which receives the high gate voltage and a second terminal connected to the first control node.

5. The gate driver of claim 4, wherein the $k^{th}$ stage further comprises:

a ninth transistor including a gate which receives a reset signal, a first terminal which receives the high gate voltage, and a second terminal connected to the first control node.

6. The gate driver of claim 1, wherein the fourth transistor is a P-type transistor.

7. The gate driver of claim 1, wherein a threshold voltage of the fourth transistor is negatively shifted in a hold period in which the gate signal has the first low gate voltage.

8. The gate driver of claim 7, wherein the threshold voltage of the fourth transistor is positively shifted in an output period in which the gate signal has the high gate voltage.

9. An electronic apparatus, comprising:

a display device which displays an image; and a processor which controls the display device, the display device comprising:

a display panel including pixels;

a data driver which provides data signals to the pixels; and a gate driver including first to $n^{th}$ stages which provide first to $n^{th}$ gate signals to the pixels, wherein n is a natural number greater than 1, wherein a $k^{th}$ stage of the first to $n^{th}$ stages, wherein k is a natural number greater than 1 and less than n, includes:

a first transistor which transmits an input signal to a first control node;

a fifth transistor including a gate connected to an inverting control node, a first terminal which receives a high gate voltage, and a second terminal connected to an output node which outputs a $k^{th}$ gate signal of the first to $n^{th}$ gate signals;

a sixth transistor including a gate connected to a second control node, a first terminal which receives a first low gate voltage or a clock signal, and a second terminal connected to the output node; and a fourth transistor connected between the first control node and the second control node, the fourth transistor including a gate which receives the first low gate voltage or a low gate voltage higher or lower than the first low gate voltage and a back gate which receives an input voltage.

10. The electronic apparatus of claim 9, wherein each of the pixels includes:

a driving transistor including a gate connected to a first node, a first terminal connected to a second node, a second terminal connected to a third node;

a writing transistor including a gate which receives a writing gate signal, a first terminal which receives one of the data signals, and a second terminal connected to the second node;

a compensation transistor including a gate which receives a compensation gate signal, a first terminal connected to the third node, and a second terminal connected to the first node;

an initialization transistor including a gate which receives an initialization gate signal, a first terminal which receives a first initialization voltage, and a second terminal connected to the first node;

a first emission transistor including a gate which receives an emission signal, a first terminal which receives a first power voltage, and a second terminal connected to the second node;

a second emission transistor including a gate which receives the emission signal, a first terminal connected to the third node, and a second terminal connected to a fourth node;

a bypass transistor including a gate which receives a bypass gate signal, a first terminal which receives a second initialization voltage, and a second terminal connected to the fourth node;

a bias transistor including a gate which receives the bypass gate signal, a first terminal which receives a bias voltage, and a second terminal connected to the second node;

a storage capacitor including a first terminal which receives the first power voltage and a second terminal connected to the first node; and a light-emitting element including a first terminal connected to the fourth node and a second terminal which receives a second power voltage.

11. The electronic apparatus of claim 10, wherein the $k^{th}$ gate signal is one of the compensation gate signal, the initialization gate signal, the emission signal, and the bypass gate signal.

12. The electronic apparatus of claim 9, wherein the fourth transistor is a P-type transistor.

* * * * *